United States Patent

[11] 3,625,873

[72] Inventor Glenn R. Wilson
        Dayton, Ohio
[21] Appl. No. 681,934
[22] Filed Nov. 9, 1967
[45] Patented Dec. 7, 1971
[73] Assignee Monsanto Research Corporation
        St. Louis, Mo.

[54] POLYIMIDE HOLLOW SPHERES
    6 Claims, No Drawings
[52] U.S. Cl. .................................................. 260/2.5 B,
        260/2.5 N, 260/2.5 D, 260/47 CZ, 260/65, 260/78
        TF, 260/857, 260/858, 260/859
[51] Int. Cl. .................................................. B01j 13/02,
        C08j 1/14
[50] Field of Search .................................... 260/2.5 N,
        2.5 B

[56] References Cited
    UNITED STATES PATENTS

| | | | |
|---|---|---|---|
| 2,797,201 | 6/1957 | Veatch et al. ................ | 260/2.5 B |
| 3,249,561 | 5/1966 | Hendrix ........................ | 260/2.5 N |
| 3,256,219 | 6/1966 | Will .............................. | 260/2.5 N |
| 3,287,311 | 11/1966 | Edwards ....................... | 260/2.5 N |
| 3,310,506 | 3/1967 | Amborski et al. ............ | 260/2.5 N |
| 3,440,197 | 4/1969 | Boldebuck et al. ........... | 260/29.2 |
| 3,172,867 | 3/1965 | Showalter ..................... | 260/2.5 B |
| 3,293,114 | 12/1966 | Kenaga et al. ................ | 260/2.5 B |

*Primary Examiner*—Murray Tillman
*Assistant Examiner*—Morton Foelak
*Attorney*—L. Bruce Stevens, Jr.

ABSTRACT: A method of making polyimide hollow spheres from a tetracarboxylic acid-ditertiary amine reaction product and an aromatic diamine in an aqueous solution.

POLYIMIDE HOLLOW SPHERES

The invention described herein was made in the course of, or under, a contract with the U.S. Atomic Energy Commission.

CROSS-REFERENCE TO RELATED APPLICATIONS

The polyimide-forming reaction mixture used herein is disclosed in application Ser. No. 681,931, filed of even date.

BACKGROUND OF THE INVENTION

According to the invention, there is provided a new and valuable method for preparing polyimide hollow spheres. Polyimide compositions are generally well-known in the art. See e.g., U.S. Pat. Nos. 3,249,561, issued May 3, 1966 to E. I. duPont de Nemours and Company, and 2,867,609, issued Jan. 6, 1959 to E. I. duPont de Nemours and Company. They are usually prepared by reaction of an aromatic tetracarboxylic acid dianhydride with an organic diamine to obtain an intermediate, curable prepolymer wherein there are present amide linkages from an amino group of the diamine and a carboxy group of the tetracarboxylic component, and two carboxy groups of the tetracarboxylic component which have not reacted with the organic amine component. Upon heating, cyclization occurs by reaction of the unreacted carboxylic group at the amide portion of the polymer to give an imide structure. Thus, condensation of, say, 1,2,4,5-benzenetetracarboxylic dianhydride and p-phenylene-diamine to give a prepolymer amide-acid and curing of the latter to a polyimide proceeds substantially as follows:

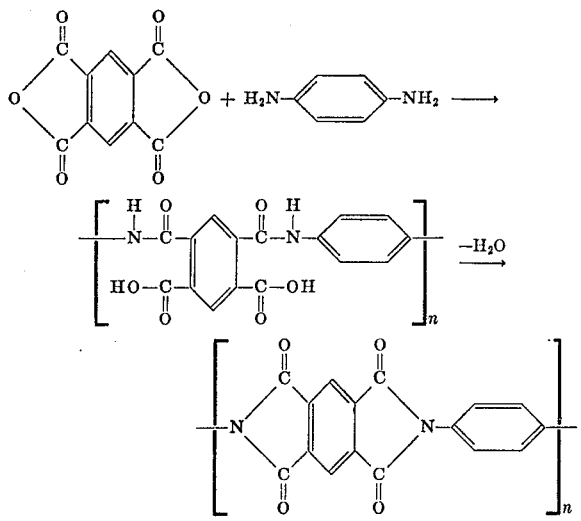

where $n$ denotes the degree of polymerization.

Because curing of the polyamide/acid gives the exceptionally stable polyimides, the prepolymers are of great potential interest for the preparation of heat- and solvent-resistant compositions. In such applications, curable materials are generally most expediently employed in solution. However, the usual prior art polyamide/acids possess limited solubility; hence, in order to employ them in these fields, it has been necessary to use such uncommon, expensive solvents as N-methylpyrrolidinone, dimethylformamide, dimethyl acetamide, dimethyl sulfoxide, etc. A further limitation of the wide applicability of the polyamide/acids is the noxious nature of such solvents.

The present invention overcomes these and other problems.

SUMMARY

This invention relates to a method for making curable hollow spheres which comprises heating under a vacuum at a temperature below 110° C. for 1 to 10 hours a polyimide-forming reaction mixture consisting of the reaction product consisting essentially of the product obtained by reacting approximately one mole of a tetracarboxylic acid of the formula

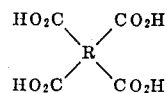

wherein R represents a tetravalent radical selected from the group consisting of

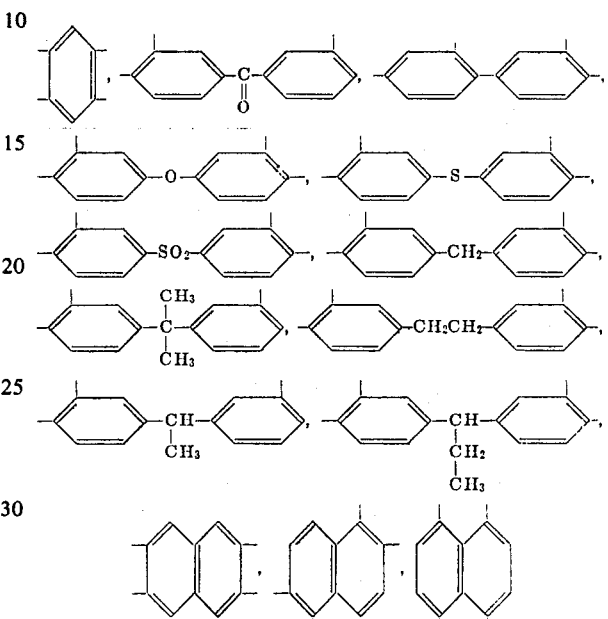

with approximately two moles of a tertiary amine having a base strength ($K_b$ in water) of $1\times10^{-3}$ to $1\times10^{-10}$ and having a boiling point below 200° C. together with a diamine of the formula $H_2N—Z—NH_2$ wherein Z is an aromatic hydrocarbon radical having from six to 18 carbon atoms, said diamine having at least one carbon atom between each amino group and being present in the amount of approximately one mole for each mole of the tetracarboxylic acid-ditertiary amine reaction product, and water in the amount of 20 to 60 percent by weight of the said reaction mixture, concentration of said reaction mixture under vacuum to obtain a loosely divided solid intermediate product, sparsely distributing the intermediate solid product thus obtained into various uniform sizes, and further heating the intermediate product from 120° to 140° C. for 1 minute to 1 hour to obtain curable hollow spheres.

The improvement of the invention over the older methods of preparing polyimide compositions lies in the use of water as a solvent for the polyimide-forming reaction mixture. This is accomplished by forming the reaction product of a tetracarboxylic acid in an aqueous solution using a tertiary amine. After solution of the acid-amine reaction product has been achieved, an aromatic primary diamine is added to the solution. The polyimide-forming reaction mixture may then be stored at room temperature or lower for an indefinite period of time, or polymerization may be presently effected to produce curable hollow spheres as hereinbefore described.

Although the mechanism by which polymerization takes place is not fully known, it is believed that upon heating, the acid-amine reaction product undergoes a change to the dianhydride and, upon further heating, the dianhydride reacts with the primary diamine to form the polyimide. Thus, condensation of, say, the dipyridinium reaction product of 1,2,4,5-benzenetetracarboxylic acid in water and m-phenylenediamine to give the tetracarboxylic dianhydride and curing of the latter with the diamine to a polyimide proceeds substantially as follows:

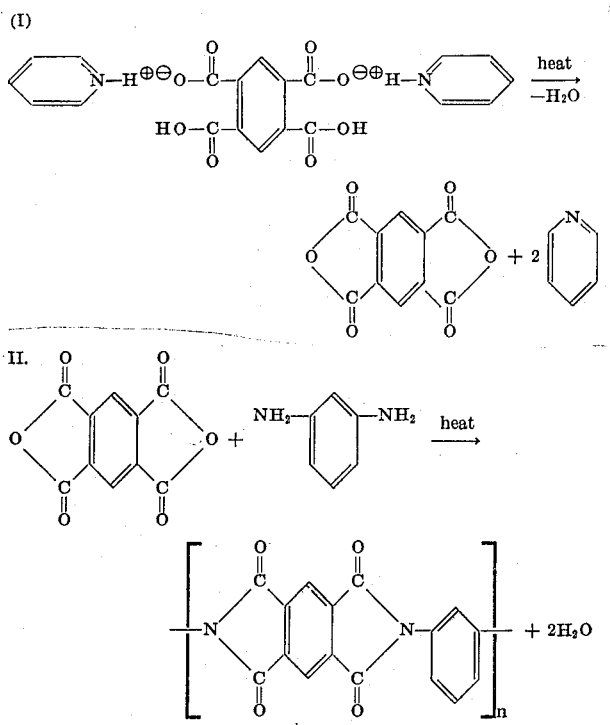

where n denotes the degree of polymerization.

The absence of polyamic acid in the final composition is determined by infrared absorption spectra. The spectra of the present compositions are characterized by absorption at 5.6 microns, indicating an imide linkage, and at 5.8 microns due to the C O bond of the carboxyl groups. The absence of absorption bands representing N—H and C O bonds of the amide groups indicates full conversion of the reactants to the polyimide polymer.

The preferred tertiary amines have a boiling point below 200° C. so that they may be substantially removed from the reaction mixture before polymerization is completed. The base strength ($K_b$ in water) of the tertiary amines used herein lies in the range of $1\times10^{-3}$ to $1\times10^{-10}$. If the base strength is greater than $1\times10^{-3}$, the ionic strength of the acid-amine reaction product may be such as to prevent formation of the dianhydride from the acid at moderate temperatures. Conversely, if the base strength is less than $1\times10^{-10}$, the tertiary amine will not be strong enough to react with the acid, and therefore solution of the acid in water cannot be achieved. 38° of the useful tertiary amines, together with their base strengths ($K_b$ in water at 20°–25° C.) and boiling points are: trimethylamine ($5.5\times10^-$, 4° C.); triethylamine ($5.7\times10^-$, 90° C.); tripropylamine ($4.4\times10^-$, 156° C.); triisobutylamine ($2.6\times10^-$, 192° C.); methyldiethylamine ($2.7\times10^-$, 63°–65° C.); dimethylethylamine ($9.8\times10^-$, 38° C.); dimethylpropylamine ($1.4\times10^-$, 65°–66° C.); dimethylbutylamine ($1.1\times10^-$, 94°–96° C.); dimethylisobutylamine ($1.2\times10^-$, 80°–81° C.); tert-butyldimethylamine ($4.1\times10^-$, 89–90° C.); methyldiisopropylamine ($1.1\times10^-$, 109°–112° C.); 1,2-bis(dimethylamino)ethane ($9\times10^{-6}$, 120° C.); 1,2-bis(dimethylamino)propane ($3\times10^{-5}$, 135°–140° C.); 1,3-bis(dimethylamino)butane ($1\times10^{-4}$, 165° C.); pyridine ($2.3\times10^-$, 115° C.); 2-methylpyridine ($1.5\times10^-$, 128° C.); 3-methylpyridine ($4.8\times10^-$, 144° C.); 4-methylpyridine ($1.1\times10^-$, 143° C.); 2,4-dimethylpyridine ($5.2\times10^-$, 157° C.); 2,6-dimethylpyridine ($4.9\times10^-$, 143° C.); 3,4-dimethylpyridine ($3.3\times10^-$, 163° C.); 2-ethylpyridine ($9.7\times10^-$, **° C.); 4-ethylpyridine ($1.1\times10^-$, 166° C.); 2-methyl-5-ethylpyridine ($3.2\times10^-$, 174° C.); dimethylaminoethanol ($1.4\times10^-$, 135° C.); diethylaminoethanol ($5\times10^{-5}$, 163° C.); diisopropylaminoethanol ($8.2\times10^-$, 187°–192° C.), etc.

Examples of useful acids are: 1,2,4,5-benzenetetracarboxylic acid; 3,3',4,4'-biphenyltetracarboxylic acid; 3,3',4,4'-benzophenonetetracarboxylic acid; bis(3,4-dicarboxylicphenyl)methane; 1,2-bis(3,4-dicarboxylicphenyl)ethane; 1,1-bis(3,4-dicarboxylicphenyl)ethane; 2,2-bis(3,4-dicarboxylicphenyl)propane; 1,1-bis(3,4-dicarboxylicphenyl) propane;, bis(3,4-dicarboxylicphenyl)ether; bis(3,4-dicarboxylicphenyl)sulfide; bis(3,4-dicarboxylicphenyl)sulfone; 3,3',4,4'-biphenyltetracarboxylic acid; 2,3,6,7-naphthalenetetracarboxylic acid; 1,2,5,6-naphthalenetetracarboxylic acid; 1,4,5,8-naphthalenetetracarboxylic acid, etc. The dianhydrides of the tetracarboxylic acids may also be employed, for when the dianhydride is added to the water, and the mixture heated, the tetracarboxylic acid is formed.

Any aromatic primary diamine having six to 18 carbon atoms may be used, provided that their is at least one carbon atom between the amino groups.

Examples of such diamines are: m-phenylenediamine; P-phenylenediamine; 2,7-naphthalenediamine; 3,6-naphthalenediamine; bis(3-aminophenyl)methane; bis(4-aminophenyl)butane; 2,7-anthracenedianmine; 3,6-anthracenediamine; p-terphenyl-4,4'''-diamine; p-terphenyl-5,3'''-diamine, etc.

In order to achieve solution of the tetracarboxylic acid in water (i.e. as the acid-amine reaction product), it is necessary that there be present 2 moles of the tertiary amine for every mole of the acid. Although this amount of the tertiary amine reacts with only 2 of the 4 carboxy groups, it has been found that this ratio of amine to acid is sufficient to completely dissolve the acid so long as the total composition contains between 20 to 60 percent by weight water.

The reaction product of the tetracarboxylic acid and the tertiary amine and the aromatic primary diamine are advantageously employed in equal stoichiometric proportions, i.e., one mole of the acid-amine reaction product per mole of the diamine. However, a slight excess of either component may be used.

The presently provided polyimide hollow spheres may be used in a wide variety of applications. The curable hollow spheres are formed by heating under a vacuum at a temperature not to exceed 110° C. preferably about 90° C. for a period of 1 to 10 hours, and preferably about 8 hours, an aqueous mixture of a tetracarboxylic acid (or its dianhydride) tertiary-amine reaction product and a primary aromatic diamine. There is obtained a "fluffy" solid. In order that this solid may be evenly separated, a sieve or any other suitable means may be employed to separate the solid into particles of various uniform sizes. The particles are then sparsely distributed over, for example, a Teflon-coated tray. These particles are distributed in such a manner that they are not touching one another. They are then heated at 120° to 140° C. for a time sufficient to form the hollow spheres, e.g., 1 hour and preferably about 15 to 20 minutes. The curable hollow spheres thus obtained are rather delicate, for polymerization is not complete, and the spherical structure is still permeated with solvent unpolymerized reactants. These spheres may be fully cured by heating to about 350° C. for 3 hours, and preferably 1 to 2 hours. Or the curable hollow spheres may be placed in a mold and heated (not to exceed 350° C.) and pressure of 100 to 300 p.s.i. may be applied to obtain an essentially rigid integral structure consisting of fused hollow spheres. The thus obtained structure is flameproof and highly resistant to heat; hence, it is particularly valuable as an insulating material. The toughness and heat-stability of these structures recommend them for use in any application where a combination of these properties is desired, e.g., fire walls in automotive vehicles, furnace insulation, roof, wall, and ceiling insulation, steam pipes, etc.

The curable hollow spheres or the fully cured hollow spheres may be employed in other polymers, e.g., polystyrene, polyethylene, polypropylene, polyurethane, polyamides, etc., to prepare syndiotactic foams.

Accordingly, an object of this invention is the provision of improved starting materials for the preparation of polyimide hollow spheres. Another object is the provision of water as the solvent for the polyimide-forming reaction mixture. A most important object is the provision of new polyimide hollow spheres.

DESCRIPTION OF THE PREFERRED EMBODIMENTS

The invention is further illustrated by, but not limited to the following examples:

EXAMPLE I

A mixture of 644.4 g. (2 moles) of 3,3',4,4'-benzophenone tetracarboxylic acid dianhydride and 795.2 g. water was thoroughly mixed to form a suspension. Over a period of 15 minutes 332.2 g. (4.2 moles) of pyridine was added, with a resulting temperature rise to 68° C. After letting the mixture cool to room temperature 216.2 g. (2 moles) of m-phenylene diamine was rapidly added without an increase in temperature and the solution was then stirred for 1 hour. This solution was stored at room temperature for about 1 week.

The solution was then concentrated under a vacuum at 90° C. for approximately 8 hours to yield a fluffy solid residue containing 27 percent volatiles (as shown by percent weight loss of a sample after heating for 3 minutes at 315° C.). The fluffy solid was screened through a 20 mesh sieve and sparsely distributed over the surface of a teflon-coated pan. The tray was then heated at 125° to 135° C. for 15 minutes under vacuum during which time the particles were converted to hollow spheres ranging in size from 0.02 mm. to 0.5 mm. (volatile content approximately 21 percent). The spheres were screened to various uniform sizes and the wall strength was increased by curing at 315° C.

EXAMPLE II

After conversion to the curable hollow spheres by heating at 125° to 135° C. as described in example I, the spheres are placed in a mold and the mold is heated to 300° C. at a pressure of 150 p.s.i. for 45 minutes. There is obtained a well-fused integral structure.

EXAMPLE III

A polyimide-forming reaction mixture is prepared as described in example I except that 700 g. (2 moles) of 3,3',4,4'3,3',4,4'ficient water (826.6 g.) is used to achieve a solution having 60 percent solids.

After heating under a vacuum at 90° C. for approximately 8 hours, screening through a 20 mesh sieve, and heating on a Teflon-coated pan at 125° to 135° C. as in example I, there is obtained hollow spheres ranging in size from 0.02 mm. to 0.5 mm. The spheres are screened to various uniform sizes and made stronger by curing at 315° C.

EXAMPLE IV

After conversion to the curable hollow spheres by heating at 125° to 135° C. as described in example III, the spheres are placed in a mold and the mold is heated to 300° C. at a pressure of 150 p.s.i. for 45 minutes. There is obtained a well-fused integral structure which is heat-resistant and flameproof.

It is to be understood that although the invention has been described with specific references to particular embodiments thereof, it is not to be so limited since changes and alternations therein may be made which are within the full intended scope of this invention as defined by the appended claims.

What I claim is:

1. A method for making curable hollow spheres which comprises
   A. heating under a vacuum at a temperature below 110° C. for 1 to 10 hours a polyimide-forming reaction mixture consisting of
      a. the reaction product consisting essentially of the product obtained by reacting approximately one mole of a tetracarboxylic acid of the formula

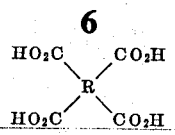

wherein R represents a tetravalent radical selected from the group consisting of

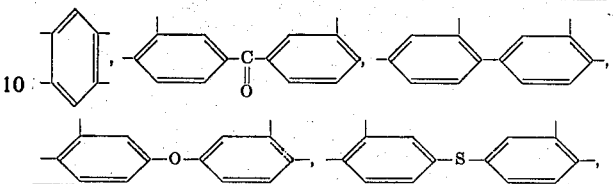

with approximately two moles of a tertiary amine having a base strength ($K_b$ in water) of $1\times10^{-3}$ to $1\times10^{-10}$ and a boiling point below 200° C. together with
      b. a diamine of the formula $H_2N-Z-NH_2$ wherein Z is an aromatic hydrocarbon radical having from six to 18 carbon atoms, said diamine having at least one carbon atom between each amino group and being present in the amount of approximately one mole for each mole of the tetracarboxylic acid ditertiary amine reaction product, and
      c. water in the amount of 20 to 60 percent by weight of the said reaction mixture, that is concentrated under vacuum to obtain a loosely divided solid intermediate product,
   B. separating said solid intermediate product into uniform sizes,
   C. sparsely distributing the uniformly sized product obtained in step B on a suitable surface,
   D. further heating the intermediate product from 120° to 140° C. for 1 minute to 1 hour to obtain curable hollow spheres.

2. The method defined in claim 1 wherein the diameter of the curable hollow spheres is from 0.01 mm. to 1.0 mm.

3. The method defined in claim 1 wherein the curable hollow spheres are further headed to about 350° C. to obtain fully cured hollow spheres.

4. The method defined in claim 1 wherein R is

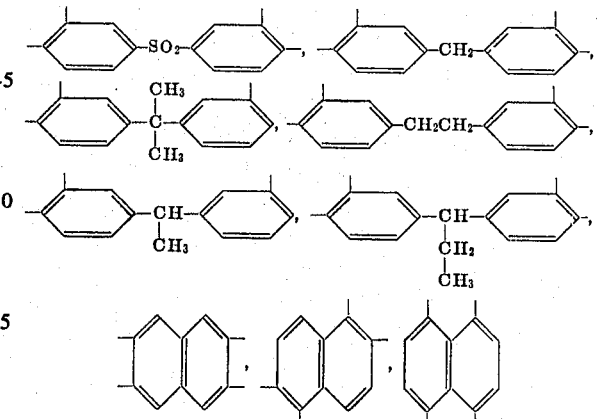

5. The method defined in claim 1 wherein Z is phenylene.

6. The method as defined in claim 1 wherein R is

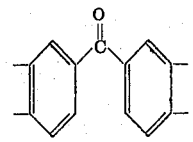

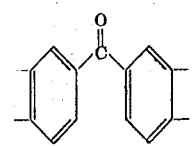

and Z is phenylene.

* * * * *

UNITED STATES PATENT OFFICE
CERTIFICATE OF CORRECTION

Patent No. 3,625,873  Dated December 7, 1971

Inventor(s) Glenn R. Wilson

It is certified that error appears in the above-identified patent and that said Letters Patent are hereby corrected as shown below:

Column 6, between lines 14 and 15, add the following:

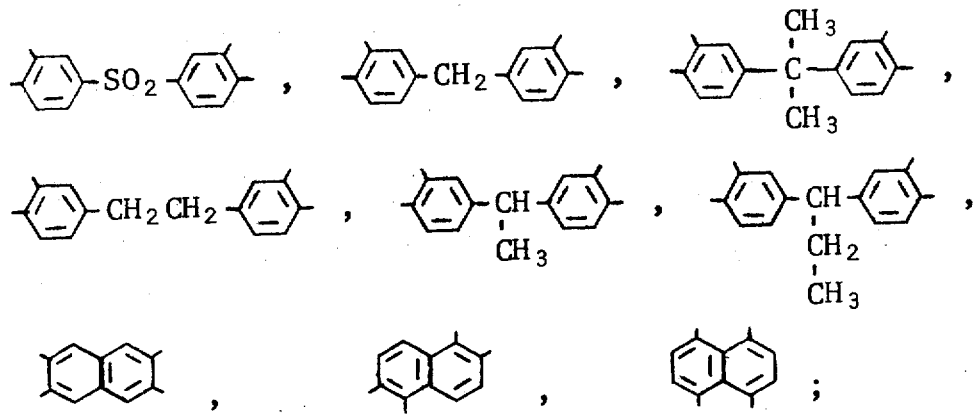

line 39, change "headed" to -- heated --; lines 42-59, cancel the entire contents of this line and insert in place thereof

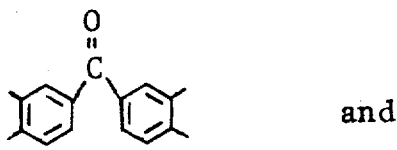 and lines 69-74, cancel

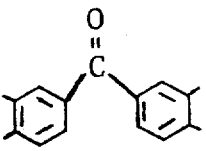

Signed and sealed this 24th day of December 1974.

(SEAL)
Attest:

McCOY M. GIBSON JR.
Attesting Officer

C. MARSHALL DANN
Commissioner of Patents